Jan. 19, 1971  W. T. GABLE, JR., ET AL  3,555,794
COTTON HARVESTER WITH PNEUMATIC GREEN BOLL SEPARATOR
Filed July 1, 1968
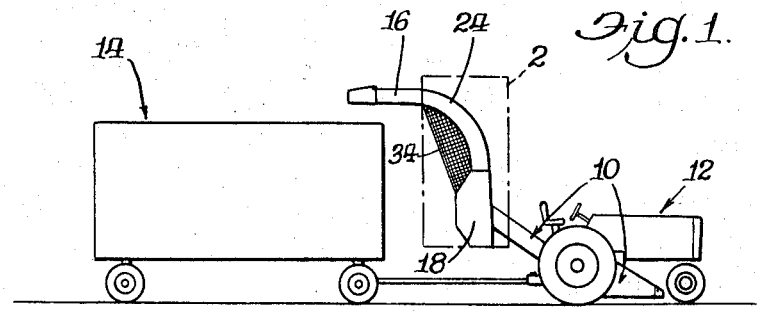
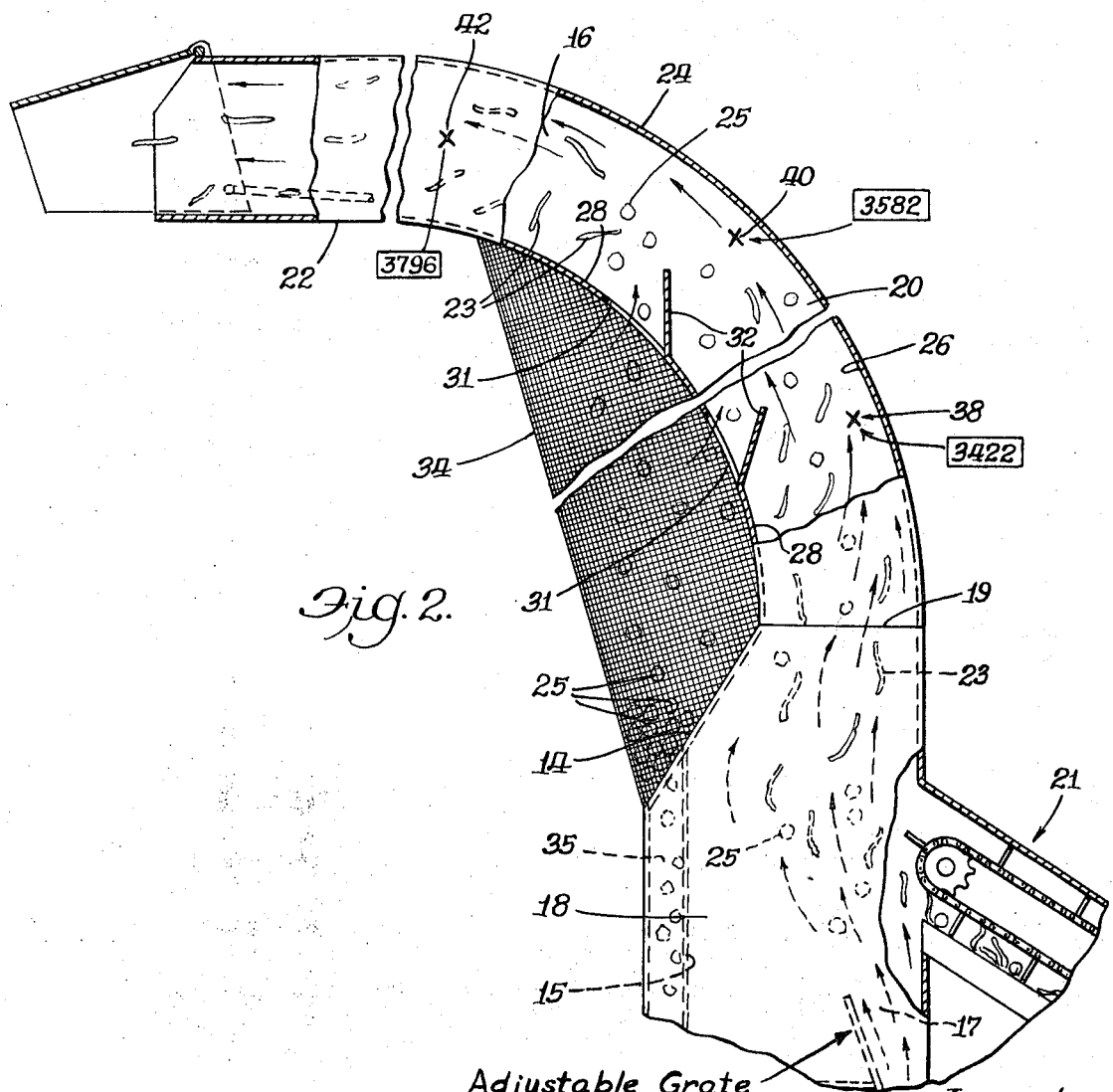
Adjustable Grate
Inventors:
Wyatt T. Gable, Jr.
Charles G. Barfield
By John J. Kowalik
Atty.

_United States Patent Office_ 3,555,794
Patented Jan. 19, 1971

3,555,794
COTTON HARVESTER WITH PNEUMATIC GREEN BOLL SEPARATOR
Wyatt T. Gable, Jr., and Charles G. Barfield, Memphis, Tenn., assignors to International Harvester Company, Chicago, Ill., a corporation of Delaware
Filed July 1, 1968, Ser. No. 741,678
Int. Cl. A01d *45/18;* B07d *11/00*
U.S. Cl. 56—30            12 Claims

ABSTRACT OF THE DISCLOSURE

A cotton harvester employing a staged separator including a curving pneumatic delivery conduit through which a laminal air stream is blown, and the conduit having louver-like baffles on the inside turn of the conduit which induces a separating acceleration of the air stream thereby conducing separation of the lint cotton from heavier green bolls which drop out of the air flow.

BACKGROUND OF THE INVENTION

The invention relates to the general field of cotton strippers wherein the cotton is picked fully, including both lint cotton and green bolls. Machines of this type usually incorporate conveying and pneumatic systems that in combination serve to convey the aggregate of lint cotton and green bolls from the stripper to a location where it is introduced into an air stream that tends to separate the lint cotton from the aggregate as it is being blown into a receptable such as a trailer or a basket. A certain portion of the green bolls are nevertheless carried to the receptacle where they are presently separated from the lint cotton at the gin entailing a loss of the green bolls and an increase in cost of processing by the gin mill.

THE PRESENT INVENTION

A broad object of the invention is to provide novel means for separating the heavier green bolls from the total mass of cotton carried by an air stream to a receptacle.

Another object is to provide an arrangement in which a pneumatic delivery conduit includes an elbow, and means for causing a laminal air flow along the outside turn of the elbow, and means for accelerating the air flow around the elbow wherein the combined effect causes the lint cotton to course along the outside turn while the green bolls drop out of the main portion of the air stream; the invention including means for removing the green bolls from the conduit.

Another object is to provide on the inside turn of the above mentioned elbow a series of perforations creating a plurality of louver-like elements protruding into the air stream providing air inlets which induce air stream acceleration.

A still further object is to provide an arrangement of the foregoing general character wherein the inside turn of the elbow having louver-like elements and suitable openings on the downstream side of said elements, deflect the separated green bolls as they roll or slide downwardly along the inside turn of the elbow through said openings into an external receptacle.

Still another object of the above mentioned arrangement is to develop along the inside turn and downstream of the louver-like protrusions a region that this effectively free of any up-effect of the main portion of the air stream in order that the separated green bolls can efficiently work downwardly and out through said openings.

BRIEF DESCRIPTION OF THE DRAWINGS

FIG. 1 is a small scale and somewhat diagrammatic view of a cotton harvester to which the present invention is applicable, together with other implements; and FIG. 2 is a large scale vertical sectional view of that portion of the apparatus of FIG. 1 enclosed in the dot-dash rectangle 2, and oriented according to FIG. 1.

DESCRIPTION OF THE PREFERRED EMBODIMENT

Referring in detail to FIG. 1, a cotton stripper is indicated in its entirety at 10 and drawn by a suitable implement 12 such as a tractor, which draws a trailer 14′. The stripper 10 includes a pneumatic delivery conduit or pipe generally designated 16 and a blower (not shown) for producing an air stream for carrying the picked or stripped cotton through the conduit 16 and into the trailer 14′. The foregoing apparatus generally is known and the following description is of the detail structure embodying the features of the present invention.

Attention is directed now to FIG. 2 showing a large scale vertical section of the separating system enclosed in the dot-dash rectangle 2 of FIG. 1. Generally, the separating system comprises a lower chamber 18 having an opening 19 in its upper portion. The upwardly extending and curving pneumatic conduit 16 merges with chamber 18 at opening 19 thereby forming a continuous internal air passage from chamber 18 through conduit 16.

Conduit 16 comprises elbow 20 having an initial vertical portion connected to chamber 18 as heretofore described, and a substantially horizontal portion merging with a tailpiece 22 which extends rearwardly in a substantially horizontal direction discharging into trailer 14. It should be noted that even though the disclosure indicates a rearward discharge direction the system could be arranged to discharge forwardly into a suitable receptacle mounted on top of the tractor 12. The chamber 18 is a box-like enclosure having a rearward wall comprising a substantially vertical lower portion 15 and an inwardly inclining upper portion 14 terminating at the opening 19. The expression, "rearward and forward wall" is oriented with respect to the direction of introduction of the aggregate. In the forward portion of the enclosure 18 conveyor 21 introduces an aggregate of lint cotton 23 and green bolls 25 in such a manner that said aggregate is dumped into the path of an air stream emitting from discharge opening 17 of the blower. Above this, the upper portion of chamber 18 has conductively connected to it the vertical portion of elbow 20 as heretofore described.

The elbow 20, which embodies the novel secondary separator comprises an upper forward wall 24 and a lower rearward wall 28 which are concentrically disposed to one another as they upwardly curve to the aft. The lower curving wall 28 is provided with apertures or openings 31 which are two in number as illustrated, and are preferably formed by a stamping operation forming baffles or louvers 32 which incline inwardly into the space of the elbow and extend generally upwardly and are positioned on the upstream side of the apertures.

It can be seen that at the lower forward portion of chamber 18 conveyor 21 transports the aggregate into this lower portion and thrusts the aggregate into the path of the air stream emitting from the blower discharge opening 17. The aggregate is then caught up and becomes entrained in the air stream and is blown in an upward and rearward direction as it transverses the chamber 18 and collides with the inclining wall portion 14. As a result of this collision there is sufficient loss of momentum of a large proportion of the heavier green bolls which drop out of the air stream at this point and are separated. The inclining wall 14 however performs another important function by deflecting the air stream and remaining aggregate upwardly into the vertical portion of elbow 20 and by directing the air flow to follow a curving course along upper forward wall 24. It should be realized at this time that as the air courses through elbow 20 it will pass over the rearwardly sloping baffles 32 and as a result of this air flow the space below and immediately downstream of said baffles 32 will experience a pressure reduction thereby inducing air to flow from outside into the elbow 20 through the openings 31. The amount of incoming air however is not sufficient in velocity to impede the egress of the separated green bolls as they fall through said openings 31, but does add a sufficient quantity of air to the air stream to induce an acceleration of the air stream velocity as it flows around the elbow rather than a decrease in velocity as would normally be expected.

This result is borne out by actual test measurements made on a device herein disclosed. Referring to point 38 (FIG. 2), within the initial portion of elbow 20, the velocity of the air stream was measured at 3422 ft./min. (feet per minute). Farther downstream however, at point 40, the velocity measured increases to 3582 ft./min.; and then finally at the horizontal portion of elbow 20 at point 42 it can be seen that any averaging of the measured velocities there shows an increase to 3796 ft./min. (average).

The effect of deflecting the aggregate to follow the upper wall 24 and inducing a simultaneous accelerating air stream combine to produce a novel and efficient separating device for separating from the remaining aggregate the residue green bolls thereby leaving only the lint cotton to be discharged from the tailpiece 22 into trailer 14'.

In order to fully appreciate the operational characteristics of this separating device, one must keep in mind the great disparity in density between lint cotton and green bolls. Lint cotton is light and fluffy and tends to accelerate quickly in response to an acceleration of the air stream, but the green bolls being much heavier and dense do not appreciably accelerate or progress as readily but tend to recede, when possible in opposition to the propelling effect of the main air stream.

It can be seen in FIG. 2 that as the air stream deflects off the wall 16 the airborne aggregate is driven upwardly along the upper wall 24 of elbow 20. Now as the aggregate courses upwardly the air stream is continually accelerating, as heretofore described, causing a progressive increase in velocity of the lint cotton thereby inducing it to course along the inner periphery of the wall 24 of elbow 20. The heavier green bolls however are not appreciably influenced by the air stream acceleration but instead tend to recede and migrate toward the lower wall 28 of elbow 20 as they progress upwardly. In the latter portion of elbow 20 that extends toward the horizontal the green bolls drop out of the main effect of the air stream while the lint cotton continues to accelerate and thus an efficient separation is accomplished.

Another novel feature embodied in the instant invention is the disposition on the lower wall 28 of the fixed vane-like elements 32 and the corresponding adjacent apertures 31, for it should be noted that elements 32 and openings 31 by being located on the lower wall 28 provide a novel means for segregating and removing the separated green bolls from the air stream. For as the green bolls drop onto wall 28 and roll or slide downwardly they become sheltered from the up-effect of the main air stream by the baffles 32 which also serve to deflect the bolls into the openings 31 where they drop completely out of the conduit 16 into an appropriate perforate retainer 34 and then through chute 35 to be collected in an appropriate receptacle (not shown).

It can also be readily appreciated that by arranging the elements 32 and opening 31 on the lower wall 28 they serve both as a green boll segregration means and a means for inducing a separating acceleration in the velocity of the main air stream thereby simultaneously filling both functions.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood, that the particular structure and functional aspect emphasized herein are not intended to exclude but rather to suggest such other modifications and adaptations as fall within the spirit and scope of the invention as defined in the appended claims.

What is claimed is:

1. In a cotton harvester having a unit for harvesting an aggregate of lint cotton and green bolls, pneumatic separator means, means for delivering the aggregate from said unit into said separator means, said separator means comprising; an inclined air channeling duct, blower means disposed at one end of said duct and operative for moving an air stream through said duct by producing a positive pressure therein; air stream acceleration means comprising at least one element angularly extending into said duct and including as associated opening in said duct disposed adjacent and downstream of said element, said element deflectingly diverting said air stream inwardly of said duct and over said opening effecting an inflow of air and an acceleration of the air stream; means for injecting said aggregate into said duct to effect an entraining of said aggregate within said air stream at a location upstream of said acceleration means; said air stream acceleration means operating upon said entrained aggregate to selectively increase lint cotton velocity over and above green boll velocity to effect a separating recession of said green bolls conducing a separation of the lint cotton from the green bolls within said duct.

2. The invention according to claim 1 wherein said duct has an upwardly inclining orientation, said duct comprising a lower inlet segment communicating with said blower means and an upper discharge segment and said air entrained mixture entering said inlet segment and being disposed to course inclningly upwardly toward said discharge segment, said inclination of said course promoting further recession of the green bolls in said accelerating air stream in said duct.

3. The invention according to claim 2 wherein said duct has a lower wall portion extending upwardly between said inlet and discharge segments, and said air stream accelerating means comprising a series of said openings through said lower wall portion and including said corresponding adjacent elements emanating from said lower wall portion and angularly extending into said duct, and each element extending over its respective opening and deflectingly diverting said air stream inwardly of the duct and over said openings, said air stream acceleration means acting as green boll segregating means wherein separated and downwardly trending green bolls are deflected through said openings by said elements.

4. The invention according to claim 3 wherein said separator means includes collecting means communicating with said openings for collecting the separated green bolls.

5. In a cotton harvester having a unit for harvesting a crop of lint cotton and green bolls, pneumatic separator means, means for delivering said crop from said unit into said separator means, said separator means comprising; an upwardly curving duct having a substantially vertical inlet portion and a substantially horizontal outlet portion; blower means for creating a positive pressure communicating with the inlet portion of said duct to produce an air stream through said duct;

air stream accelerating means disposed downstream of said inlet portion and comprising a plurality of elements extending angularly into said duct and each element including an associated opening in said duct disposed adjacent and downstream of its respective element, said elements deflecting diverting said air stream inwardly of said duct and over its respective opening thereby effecting an inflow of air into said duct through said openings and an acceleration of said air stream within said duct from said inlet portion toward said outlet portion; conveyor means operative to inject said crop into said separator and to entrain the same into said air stream at a location upstream of said acceleration means; said acceleration of the air stream producing a velocity disparity between the lint cotton and green bolls by accelerating the former beyond that of the green bolls to cause the green bolls to recede from said lint cotton.

6. The invention according to claim 5 and said curved duct having a lower wall portion defining the inner curve thereof, and said air stream accelerating means disposed on said lower wall to serve as green boll segregating means which provides for the removal of separated green bolls from the duct.

7. The invention according to claim 5 and said curved duct comprising upwardly curving top and bottom substantially concentric walls and said air stream accelerating means disposed on said bottom wall, each said adjacent element of said air accelerating means having a planar make-up and emanating from said bottom wall and angularly extending transversely into said duct toward said respective aperture, and said element deflecting said air stream upwardly and over said aperture enabling the separated green bolls to trend downwardly along said bottom wall and out of the up-effect of said air stream and said elements providing a green boll deflecting surface for guiding the bolls through said apertures into an associated receptacle.

8. The invention according to claim 7 and said separator means having a primary separating chamber for receiving the crop and initiating a separation of the green bolls from the lint cotton, said vertical inlet portion of said duct conductively connected to said chamber and receiving from said chamber a residue of air entrained green bolls and lint cotton for separation within said duct, and a tailpiece merging with the outlet portion of said duct for conducting air entrained lint cotton to associated collecting means.

9. The invention according to claim 8 and said primary chamber having air deflecting means therein, said blower means and conveyor means operatively interacting to produce an airborne crop and directing said airborne crop to collide against said air deflecting means promoting heavier green bolls to drop out of said air stream effected by a loss in momentum attendant the collision, and said air deflecting means deflecting said air stream into said vertical portion and along the top wall of said duct.

10. The invention according to claim 9 and said primary chamber having an upper portion and a lower portion and said air deflecting means disposed therebetween, and said flower means and said delivery means producing said air-borne crop issuing from said lower portion and transversing said chamber upwardly toward said air-deflecting means and said vertical portion of said duct operatively connected to said upper portion to receive said residue of air entrained green bolls and lint cotton.

11. The invention according to claim 10 and said chamber having an upwardly directed wall extending from said lower portion to said upper portion and incorporating said air deflecting means.

12. The invention according to claim 11 and said walls having a substantially vertical lower segment and an inwardly inclining upper segment communicating with said vertical portion of said duct, and said upper segment serving as said air deflecting means.

References Cited

UNITED STATES PATENTS

| | | | |
|---|---|---|---|
| 969,157 | 9/1910 | Day | 209—138 |
| 2,439,179 | 4/1948 | McGinnis | 209—137 |
| 2,668,330 | 2/1954 | Gieszl | 209—138 |
| 2,963,153 | 12/1960 | Boesch | 209—143 |
| 3,164,548 | 1/1965 | Rowell | 209—139 |
| 3,397,522 | 8/1968 | Sanderson | 56—30 |

FRANK W. LUTTER, Primary Examiner

R. J. HILL Assistant Examiner

U.S. Cl. X.R.
209—136, 147, 154